United States Patent
Matsuki et al.

(10) Patent No.: US 12,091,585 B2
(45) Date of Patent: Sep. 17, 2024

(54) TWO-PART URETHANE ADHESIVE COMPOSITION

(71) Applicant: SIKA TECHNOLOGY AG, Baar (CH)

(72) Inventors: Yuichi Matsuki, Kanagawa (JP); Megumi Abe, Kanagawa (JP)

(73) Assignee: SIKA TECHNOLOGY AG, Baar (CH)

( * ) Notice: Subject to any disclaimer, the term of this patent is extended or adjusted under 35 U.S.C. 154(b) by 831 days.

(21) Appl. No.: 16/973,699

(22) PCT Filed: Jun. 7, 2019

(86) PCT No.: PCT/JP2019/022776
§ 371 (c)(1),
(2) Date: Dec. 9, 2020

(87) PCT Pub. No.: WO2019/240046
PCT Pub. Date: Dec. 19, 2019

(65) Prior Publication Data
US 2021/0253920 A1    Aug. 19, 2021

(30) Foreign Application Priority Data
Jun. 13, 2018    (JP) ................. 2018-113197

(51) Int. Cl.
| | |
|---|---|
| *C09J 175/08* | (2006.01) |
| *C08G 18/12* | (2006.01) |
| *C08G 18/20* | (2006.01) |
| *C08G 18/32* | (2006.01) |
| *C08G 18/48* | (2006.01) |
| *C08G 18/66* | (2006.01) |
| *C08G 18/72* | (2006.01) |
| *C08G 18/76* | (2006.01) |
| *C08G 18/79* | (2006.01) |
| *C08K 3/26* | (2006.01) |

(52) U.S. Cl.
CPC ............ *C09J 175/08* (2013.01); *C08G 18/12* (2013.01); *C08G 18/2081* (2013.01); *C08G 18/3215* (2013.01); *C08G 18/4812* (2013.01); *C08G 18/4816* (2013.01); *C08G 18/4829* (2013.01); *C08G 18/4841* (2013.01); *C08G 18/4866* (2013.01); *C08G 18/667* (2013.01); *C08G 18/724* (2013.01); *C08G 18/7671* (2013.01); *C08G 18/792* (2013.01); *C08K 2003/265* (2013.01)

(58) Field of Classification Search
CPC ...... C09J 175/00; C09J 175/04; C09J 175/08; C08G 18/12; C08G 18/10; C08G 18/4841
USPC .................................... 525/59, 60
See application file for complete search history.

(56) References Cited

U.S. PATENT DOCUMENTS

| | | |
|---|---|---|
| 2003/0134921 A1 | 7/2003 | Dexheimer |
| 2012/0295104 A1 | 11/2012 | Barker |
| 2017/0204311 A1* | 7/2017 | Matsuki ............. C08G 18/4812 |
| 2017/0260434 A1 | 9/2017 | Matsuki et al. |

FOREIGN PATENT DOCUMENTS

| | | | |
|---|---|---|---|
| CN | 1606584 A | | 4/2005 |
| CN | 104 0398 52 A1 | | 11/2012 |
| CN | 107075338 A | | 8/2017 |
| CN | 109563393 A | | 4/2019 |
| EP | 1458788 A1 | | 9/2004 |
| EP | 3208321 A1 | | 8/2017 |
| EP | 3495442 A1 | | 6/2019 |
| JP | 2000-239338 | | 9/2000 |
| JP | 2005-513222 A | | 5/2005 |
| JP | 2007-031483 A | | 2/2007 |
| JP | 2015067663 A | * | 4/2015 |
| JP | 2017206600 A | * | 11/2017 |
| JP | 2018-002954 A | | 1/2018 |
| KR | 10-2004-0068222 A | | 7/2004 |
| WO | 2003/054057 A1 | | 7/2003 |
| WO | WO 2012 158 664 A2 | | 11/2012 |
| WO | WO 2012/158664 | | 11/2012 |
| WO | WO-2015186555 A1 * | 12/2015 | ............. C08G 18/12 |
| WO | 2016/080508 A1 | | 5/2016 |
| WO | 2018/025702 A1 | | 2/2018 |

OTHER PUBLICATIONS

Shimizu, Yoshihisa, Et Al. "Characteristics of polyurethane using high-purity PPG".

* cited by examiner

*Primary Examiner* — David J Buttner
*Assistant Examiner* — Surbhi M Du
(74) *Attorney, Agent, or Firm* — Oliff PLC

(57) ABSTRACT

A two-part urethane adhesive composition that provides excellent initial adhesiveness and excellent long-term adhesiveness. An embodiment of the present invention is a two-part urethane adhesive composition including a main agent containing a urethane prepolymer having an isocyanate group, and a curing agent containing a compound (A) having two or more active hydrogen-containing groups per molecule, the compound (A) including a polyol compound (a1), the polyol compound (a1) having three active hydrogen-containing groups per molecule, having ethylene oxide at a terminal, having a number average molecular weight of greater than 1000 and 20000 or less, having a degree of unsaturation of 0.01 meq/g or less, and having molecular weight distribution (Mw/Mn) of 1.05 or less, and a molar ratio of a total amount of active hydrogen in the compound (A) with respect to an amount of the isocyanate group being 0.2 or greater and less than 0.8.

13 Claims, No Drawings

TWO-PART URETHANE ADHESIVE COMPOSITION

TECHNICAL FIELD

The present invention relates to a two-part urethane adhesive composition.

BACKGROUND ART

In the related art, a two-part urethane adhesive composition has been proposed as an adhesive composition (for example, Patent Document 1).

Patent Document 1 describes a two-part urethane adhesive composition including a main agent containing a urethane prepolymer, water, and a curing agent containing a bi- or higher-functional active hydrogen-containing compound, and describes a polyol and the like as the active hydrogen-containing compound.

CITATION LIST

Patent Literature

Patent Document 1: JP 2007-031483 A

SUMMARY OF INVENTION

Technical Problem

When the present inventors have prepared a composition with reference to Patent Document 1 and evaluated this composition, it has been found that in a case where a curing agent in a two-part urethane adhesive composition contains a known polyol, initial adhesiveness (for example, rapid curability immediately after adhesion) or long-term reliability of adhesiveness (for example, in the presence of water or at high temperature) (hereinafter, this may be referred to as "long-term adhesiveness") may become lower.

Then, an object of the present invention is to provide a two-part urethane adhesive composition that provides excellent initial adhesiveness and excellent long-term adhesiveness.

Solution to Problem

As a result of diligent research to solve the problems described above, the present inventors found that desired effects can be obtained by using, in a two-part urethane adhesive composition, a polyol compound having a predetermined range of degree of unsaturation and the like and having ethylene oxide at a terminal, and by setting an amount of active hydrogen in a compound (A) (as a curing agent in a narrow sense) in a curing agent (in a broad sense) to a specific amount, and thus have completed an embodiment of the present invention.

An embodiment of the present invention is based on the findings described above and, specifically, solves the problems described above by the following configurations.

[1] A two-part urethane adhesive composition including
a main agent containing a urethane prepolymer having an isocyanate group, and
a curing agent containing a compound (A) having two or more active hydrogen-containing groups per molecule, the compound (A) including a polyol compound (a1), the polyol compound (a1) having three active hydrogen-containing groups per molecule, having ethylene oxide at a terminal, having a number average molecular weight of greater than 1000 and 20000 or less, having a degree of unsaturation of 0.01 meq/g or less, and having molecular weight distribution (Mw/Mn) of 1.05 or less, and
a molar ratio of a total amount of active hydrogen in the compound (A) with respect to an amount of the isocyanate group being 0.2 or greater and less than 0.8.

[2] The two-part urethane adhesive composition according to [1], wherein
each of the active hydrogen-containing groups in the polyol compound (a1) is a hydroxy group,
the ethylene oxide in the polyol compound (a1) is represented by $-(CH_2CH_2-O)_{r1}-$, where the r1 moiety is 1 or 2 or greater, and the hydroxy group and the $-(CH_2CH_2-O)_{r1}-$ moiety are linked to form $-(CH_2CH_2-O)_{r1}-H$.

[3] The two-part urethane adhesive composition according to [2], wherein the polyol compound (a1) has three $-(CH_2CH_2-O)_{r1}-H$ moieties per molecule.

[4] The two-part urethane adhesive composition according to any one of [1] to [3], wherein, in the polyol compound (a1), each of the active hydrogen-containing groups is bonded to a linking group via the ethylene oxide.

[5] The two-part urethane adhesive composition according to any one of [1] to [4], wherein the compound (A) further includes a polyol compound (a2), the polyol compound (a2) having three or more active hydrogen-containing groups per molecule and having a number average molecular weight from 200 to 1000.

[6] The two-part urethane adhesive composition according to [5], wherein the polyol compound (a2) has ethylene oxide at a terminal.

[7] The two-part urethane adhesive composition according to [5] or [6], wherein
each of the active hydrogen-containing groups in the polyol compound (a2) is a hydroxy group,
the polyol compound (a2) has ethylene oxide at a terminal,
the ethylene oxide in the polyol compound (a2) is represented by $-(CH_2CH_2-O)_{r2}-$, where the r2 moiety is 1 or 2 or greater, and the hydroxy group and the $-(CH_2CH_2-O)_{r2}-$ moiety are linked to form $-(CH_2CH_2-O)_{r2}-H$.

[8] The two-part urethane adhesive composition according to [7], wherein the polyol compound (a2) has four or more $-(CH_2CH_2-O)_{r2}-H$ moieties per molecule.

[9] The two-part urethane adhesive composition according to any one of [5] to [8], wherein
the polyol compound (a2) has ethylene oxide at a terminal and,
in the polyol compound (a2), each of the active hydrogen-containing groups is bonded to a linking group via the ethylene oxide.

[10] The two-part urethane adhesive composition according to any one of [5] to [9], wherein
an amount (H1) of active hydrogen in the polyol compound (a1) is from 20 to 80 mol % with respect to a total of the amount (H1) and an amount (H2) of active hydrogen in the polyol compound (a2), and
the amount (H2) is from 80 to 20 mol % with respect to the total of the amount (H1) and the amount (H2).

[11] The two-part urethane adhesive composition according to any one of [1] to [10], used for adhering a base material.

[12] The two-part urethane adhesive composition according to [11], wherein the base material includes a polyolefin.

Advantageous Effects of Invention

A two-part urethane adhesive composition according to an embodiment of the present invention provides excellent initial adhesiveness and excellent long-term adhesiveness.

DESCRIPTION OF EMBODIMENTS

Embodiments of the present invention will be described in detail below.

Note that, in the present specification, (meth)acrylate represents acrylate or methacrylate, (meth)acryloyl represents acryloyl or methacryloyl, and (meth)acryl represents acryl or methacryl.

Additionally, in the present specification, the value range indicated by using "from . . . to . . . " means the range including the former value as a lower limit value and the later value as an upper limit value.

In the present specification, unless otherwise indicated, a substance corresponding to each component can be used alone or in combination of two or more types thereof. In a case where a component includes two or more types of substances, content of component means the total content of the two or more types of substances.

In the present specification, the case where at least one of initial adhesiveness or long-term adhesiveness is more excellent may be referred to as more excellent effect according to an embodiment of the present invention.

Two-Part Urethane Adhesive Composition

A two-part urethane adhesive composition according to an embodiment of the present invention (composition according to an embodiment of the present invention) is
 a two-part urethane adhesive composition including
 a main agent containing a urethane prepolymer having an isocyanate group, and
 a curing agent containing a compound (A) having two or more active hydrogen-containing groups per molecule,
 the compound (A) including a polyol compound (a1), and
 the polyol compound (a1) having three active hydrogen-containing groups per molecule, having ethylene oxide at a terminal, having a number average molecular weight of greater than 1000 and 20000 or less, having a degree of unsaturation of 0.01 meq/g or less, and having molecular weight distribution (Mw/Mn) of 1.05 or less, and
 a molar ratio of a total amount of active hydrogen in the compound (A) with respect to an amount of the isocyanate group being 0.2 or greater and less than 0.8.

In the related art, a polyether polyol such as polypropylene glycol (PPG) has been used as a raw material for a urethane-based adhesive.

According to the following reference document, a polypropylene glycol (for example, PPG having a structure indicated below) is obtained by ring-opening polymerization of propylene oxide (PO) and is a polyol most commonly used as a raw material for polyurethane, and use of potassium hydroxide (KOH) as a polymerization catalyst in the production of the polypropylene glycol is common, and mono-ol having a double bond at one terminal (about 50 mol %) (mono-ol having a structure indicated below) is formed as a by-product.

Additionally, PPG (DMC-PPG) obtained from a double metal cyanide complex (DMC) catalyst is described to have a smaller content of the mono-ol than that of PPG obtained from potassium hydroxide, but to have low purity as PPG.

(Reference Document: 26th Polymer Material Forum, Proceeding p. 110, "Characteristic of polyurethan using high purity PPG", Tosoh Corporation, Yoshihisa SHIMIZU, Toshio OHHAMA, Yoshiaki INOUE, Toshihide YAMAMOTO, Katsuaki MORI)

In this way, polypropylene glycol used in the related art has contained a large amount of mono-ol having a double bond at one terminal.

[Chemical Formula 1]

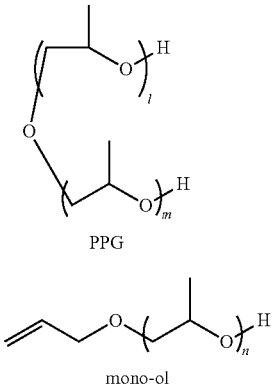

The present inventors considers that the same applies to a tri- or higher functional polyoxyalkylene polyol such as polyoxyalkylene triol.

In other words, it is presumed that, as with the related art, in a case where a polyol of a target substance is produced by adding an oxyalkylene such as oxyethylene or oxypropylene by using, for example, potassium hydroxide or a double metal cyanide complex catalyst as a polymerization catalyst (hereinafter, description is made assuming that the target substance is, for example, a polyoxyalkylene triol), in addition to the polyoxyalkylene triol, polyoxyalkylene having a double bond at one end portion and having one hydroxy group at each of two end portions, and/or (poly)oxyalkylene having one hydroxy group at one end portion and having one double bond at each of two end portions are formed as by-products.

As described above, in a case where PPG or polyoxyalkylene polyol such as polyoxyalkylene triol includes (poly)oxyalkylene having a double bond at an end portion as described above as a by-product, the degree of unsaturation of obtained polyoxyalkylene polyol becomes high.

On the other hand, a low degree of unsaturation of obtained polyoxyalkylene polyol becomes an indicator indicating that the content of by-products such as the mono-ol described above is small in the polyoxyalkylene polyol.

Additionally, in the two-part urethane adhesive composition, when the content of the by-products derived from the polyol compound is large, as a result of reaction between the urethane prepolymer and the by-products, a terminal of the urethane prepolymer is capped with the by-products (particularly, the mono-ol or the (poly)oxyalkylene mono-ol having one hydroxy group and having two double bonds at terminals is presumed), and, for example, the physical properties of an obtained cured product may not be exhibited in accordance with compounding design.

On the other hand, it is considered that, since the composition according to an embodiment of the present invention has the configuration described above, desired effects can be obtained. Although the reason is not clear, it is presumed as follows.

The curing agent in the composition according to an embodiment of the present invention includes a polyol compound (a1). The polyol compound (a1) has three active hydrogen-containing groups per molecule (being trifunctional). Additionally, the degree of unsaturation of the polyol compound (a1) is 0.01 meq/g or less, and is lower than that of known PPG or polyoxyalkylene triol.

In an embodiment of the present invention, it is considered that, a defect such as capping by the by-products described above is small, and further the polyol compound (a1) is trifunctional and has ethylene oxide at a terminal, and an amount of active hydrogen in the compound (A) is set to a specific range, and thus the composition according to an embodiment of the present invention provides a rapid curing rate at an initial period of adhesion and excellent initial adhesiveness and high long-term adhesiveness.

Each of components in the composition according to an embodiment of the present invention will be described in detail below.

The composition according to an embodiment of the present invention includes a main agent and a curing agent.

Main Agent

The main agent contains a urethane prepolymer having an isocyanate group.

Urethane Prepolymer

The urethane prepolymer is not particularly limited as long as the urethane prepolymer is a compound having an isocyanate group.

An example of a preferable aspect is one in which the urethane prepolymer has a plurality of isocyanate groups (preferably, two isocyanate groups).

The urethane prepolymer preferably has an isocyanate group at a molecular terminal.

As the urethane prepolymer, a known urethane prepolymer can be used. For example, a reaction product obtained by allowing a polyisocyanate compound to react with a compound having two or more active hydrogen-containing groups per molecule (hereinafter, abbreviated as an "active hydrogen compound") in a manner that an amount of the isocyanate group becomes excess with respect to an amount of the active hydrogen-containing groups, or the like can be used.

Active hydrogen-containing group

In an embodiment of the present invention, active hydrogen-containing group means a group containing active hydrogen.

The active hydrogen can react with an isocyanate group, for example.

Examples of the active hydrogen-containing group include a hydroxy group, an amino group, and an imino group.

Polyisocyanate Compound

The polyisocyanate compound used in the production of the urethane prepolymer is not particularly limited as long as the polyisocyanate compound has two or more isocyanate groups in a molecule.

Examples of the polyisocyanate compound include an aromatic polyisocyanate compound such as tolylene diisocyanate (TDI), diphenylmethane diisocyanate (MDI), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate;

aliphatic polyisocyanate (the aliphatic is a concept including straight-chain, branched, and alicyclic), such as hexamethylene diisocyanate (HDI), trimethyl hexamethylene diisocyanate (TMHDI), lysine diisocyanate, norbornane diisocyanate (NBDI), trans-cyclohexane-1,4-diisocyanate, isophorone diisocyanate (IPDI), bis(isocyanatemethyl)cyclohexane ($H_6$XDI), and dicyclohexylmethane diisocyanate ($H_{12}$MDI); and carbodiimide-modified polyisocyanates of these.

Among these, from the reason of excellent curability (for example, in a case where heating is performed at from 40 to 80° C. for approximately from 5 to 60 minutes, the reactivity of the polyisocyanate compound with respect to the active hydrogen compound or the reactivity of the urethane prepolymer with respect to a compound (A)), an aromatic polyisocyanate is preferable, and MDI is more preferable.

Active Hydrogen Compound

The compound having two or more active hydrogen-containing groups per molecule (active hydrogen compound) that is used in the production of the urethane prepolymer is not particularly limited. Examples of the active hydrogen-containing group include a hydroxy (OH) group, an amino group, and an imino group.

Suitable examples of the active hydrogen compound include a polyol compound having two or more hydroxy (OH) groups per molecule, and a polyamine compound having two or more amino groups and/or imino groups per molecule. Among these, a polyol compound is preferable.

Polyol Compound

The molecular weight and a backbone of the polyol compound are not particularly limited as long as the polyol compound is a compound having two or more OH groups. Specific examples of the polyol compound include polyether polyol; polyester polyol; acrylic polyol; polybutadiene polyol, and hydrogenated polybutadiene polyol; low-molecular-weight polyhydric alcohols; and mixed polyols of these. Among these, an example of a preferable aspect is one in which the polyol compound is a polyether polyol.

Polyether polyol

The polyether polyol is not particularly limited as long as the polyether polyol is a compound having a polyether as a main chain and having two or more hydroxy groups.

Polyether

Polyether refers to a group having two or more ether bonds, and specific examples of the polyether include a structure represented by $—(R^a—O)_n—R^b—$. Note that, in the structure above, $R^a$ and $R^b$ each independently represent a hydrocarbon group. The hydrocarbon group is not particularly limited. Examples of the hydrocarbon group include a straight-chain alkylene group having from 1 to 10 carbons, a cycloalkylene group, or combinations of these. Examples of the alkylene group include an ethylene group, a trimethylene group, a propylene group, and a tetramethylene group. n can be 2 or greater.

Examples of the polyether polyol include polyoxyethylene diol (polyethylene glycol), polyoxypropylene diol (polypropylene glycol; PPG), polyoxypropylene triol, an ethylene oxide/propylene oxide copolymer, a polyol compound having ethylene oxide at a terminal (for example, a polyol compound (a1) described below), a polyol compound (a2) in the case of having a polyether backbone; polytetramethylene ether glycol (PTMEG), polytetraethylene glycol, and sorbitol polyol.

The polyether polyol is preferably polypropylene glycol or polyoxypropylene triol from the perspective of excellent miscibility with the polyisocyanate compound.

The degree of unsaturation of the polyether polyol is not particularly limited. The degree of unsaturation may be greater than 0.01 meq/g.

The number average molecular weight of the polyol compound (for example, polyether polyol) is preferably from 500 to 20000, from the perspective of fluidity in which the viscosity of the urethane prepolymer obtained by reaction with an isocyanate compound is appropriate at ambient temperature. In an embodiment according to the present invention, number average molecular weight is a value obtained by a GPC method (solvent: tetrahydrofuran (THF)) calibrated with polystyrene.

A method of producing the polyol compound is not particularly limited. Examples of the method include a known method. An example of a preferable aspect is one in which the polyol compound used in the production of the urethane prepolymer is a polyol compound produced by using, for example, potassium hydroxide or a double metal cyanide complex catalyst.

The urethane prepolymer is preferably a urethane prepolymer obtained by allowing a polyether polyol and an aromatic polyisocyanate compound to react, from the perspective of more excellent predetermined adhesiveness and excellent curability (for example, reactivity of the urethane prepolymer with respect to the compound (A) in a case where heating is performed at from 40 to 80° C. for approximately from 5 to 60 minutes).

A method of producing the urethane prepolymer is not particularly limited. For example, the urethane prepolymer can be produced by using a polyisocyanate compound to allow from 1.5 to 2.5 mol of an isocyanate group to react with respect to 1 mol of an active hydrogen-containing group (for example, a hydroxy group) in an active hydrogen compound, and mixing these to allow them to react.

Curing Agent

In the composition according to an embodiment of the present invention, the curing agent contains the compound (A) having two or more active hydrogen-containing groups per molecule.

The curing agent is a concept corresponding to the main agent. The curing agent can be said to be a curing agent in a broad sense. An embodiment of the present invention is a two-part (type) composition including the main agent and the curing agent (in a broad sense).

The compound (A) in the curing agent (in a broad sense) is a compound that can function as an actual curing component. The compound (A) can be said to be a curing agent in a narrow sense.

Compound (A)

The compound (A) in the curing agent is a compound having two or more active hydrogen-containing groups per molecule.

In an embodiment of the present invention, the number of the active hydrogen-containing groups per molecule in the compound (A) is 2 or more. The number can be 6 or less.

In an embodiment of the present invention, in a case where a polyol compound in which the active hydrogen-containing groups per molecule are hydroxy groups (for example, the polyol compound (a1), and polyol compound (a2) described below) is used as the compound (A), number of active hydrogen-containing groups (hydroxy groups) in polyol compound refers to the number of active hydrogen atoms per molecule of an initiator (active hydrogen-containing compound) used as a raw material in the production of the polyol compound. In a case where the number of the active hydrogen atoms in the initiator cannot be identified for a reason of, for example, the compound (A) being a commercially available product, the nominal functional group number of hydroxy groups is the number of the active hydrogen-containing groups per molecule of the polyol compound.

Additionally, in an embodiment of the present invention, as for the number of the active hydrogen-containing groups (hydroxy groups) of the polyol compound that can be used as the compound (A), reduction of the number (functional group number) of the active hydrogen-containing groups (hydroxy groups) by the by-products described above is not taken into account.

Active Hydrogen-Containing Group

Active hydrogen-containing group in compound (A) refers to a group containing active hydrogen. The active hydrogen can react with respect to an isocyanate group, for example. Examples of the active hydrogen-containing group include a hydroxy group, an amino group, and an imino group.

Among these, the active hydrogen-containing group in the compound (A) is preferably a hydroxy group.

Polyol Compound (a1)

In an embodiment of the present invention, the compound (A) includes the polyol compound (a1).

The polyol compound (a1) is a compound having three active hydrogen-containing groups per molecule, having ethylene oxide at a terminal, having a number average molecular weight of greater than 1000 and 20000 or less, having a degree of unsaturation of 0.01 meq/g or less, and having molecular weight distribution (Mw/Mn) of 1.05 or less.

In an embodiment of the present invention, by use of the polyol compound (a1), an embodiment of the present invention provides excellent initial adhesiveness and excellent long-term adhesiveness.

The composition according to an embodiment of the present invention provides more excellent initial adhesiveness and/or long-term adhesiveness than the case where a polyol compound having a degree of unsaturation of greater than 0.01 meq/g is used as the compound (A).

Additionally, the composition according to an embodiment of the present invention provides more excellent initial adhesiveness and/or long-term adhesiveness than the case of using, for example, a polyol compound that is identical to the polyol compound (a1) except that the polyol compound has a propylene oxide at a terminal and has two hydroxy groups per molecule, as the compound (A).

Active Hydrogen-Containing Group

In an embodiment of the present invention, the polyol compound (a1) has three active hydrogen-containing groups per molecule.

Additionally, in an embodiment of the present invention, the active hydrogen-containing groups in the polyol compound (a1) are hydroxy groups. In other words, the polyol compound (a1) has three hydroxy groups per molecule.

In the polyol compound (a1), positions of the active hydrogen-containing groups are not particularly limited. The active hydrogen-containing groups are each preferably bonded to an end portion of the ethylene oxide from the perspective of more excellent effect according to an embodiment of the present invention.

Terminal

In an embodiment of the present invention, the polyol compound (a1) has ethylene oxide at a terminal.

Note that "terminal" means a terminal with respect to all the polyol compound (a1).

The ethylene oxide can be represented by, for example, —(CH$_2$—CH$_2$—O)$_{r1}$—The r1 moiety can be 1 or 2 or greater. An upper limit of the r1 moiety can be, for example, 500 or less.

In a plurality of the —(CH$_2$—CH$_2$—O)$_{r1}$— moieties, the r1 moieties may be identical or may differ.

An example of a preferable aspect is one in which the r1 moiety is 2 or greater. Note that, in the present specification, in a case where the r1 moiety is 2 or greater, the ethylene oxide may be referred to as "polyethylene oxide."

Since the ethylene oxide is a divalent group, when the ethylene oxide is positioned at a terminal of the polyol compound (a1), another group can be bonded to an end portion of the ethylene oxide.

Examples of such another group include an active hydrogen-containing group (hydroxy group) in the polyol compound (a1).

In a case where the hydroxy group as the active hydrogen-containing group is bonded to an end portion of the ethylene oxide, an oxygen atom constituting the hydroxy group may constitute an oxygen atom at an end portion of the ethylene oxide.

Specifically, for example, the hydroxy group as the active hydrogen-containing group can be linked with the —(CH$_2$CH$_2$—O)$_{r1}$— moiety to form —(CH$_2$CH$_2$—O)$_{r1}$—H.

The polyol compound (a1) preferably has three —(CH$_2$CH$_2$—O)$_{r1}$—H moieties per molecule from the perspective of more excellent effect according to an embodiment of the present invention. In this case, a plurality of the r1 moieties can each independently be 1 or 2 or greater. Upper limits of the r1 moieties can each independently be, for example, 500 or less.

Linking Group

In the polyol compound (a1), the ethylene oxide can be bonded to a linking group.

The linking group is not particularly limited as long as the linking group is a tri- or higher-valent group.

Examples of the linking group include polyether.

The polyether as the linking group can be the same as the polyether described in " . . . Polyether" above, for example.

Compound Represented by Formula (1)

Examples of the polyol compound (a1) include a compound represented by Formula (1) below.

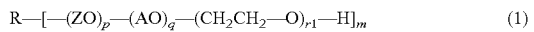

R—[—(ZO)$_p$—(AO)$_q$—(CH$_2$CH$_2$—O)$_{r1}$—H]$_m$ (1)

In Formula (1) above, R represents an m-valent group obtained by removing m active hydrogen from an active hydrogen-containing compound (R[—H]$_m$) used in the production of the compound represented by Formula (1).

m is 3.

Z represents an alkylene group having from 2 to 12 carbons, a cycloalkylene group, or combinations of these.

A represents an alkylene group having 3 carbons.

In a case where a plurality of the Z moieties or a plurality of the A moieties exist, the Z moieties may be identical or may differ, and the A moieties may be identical or may differ.

p represents 0 or from 1 to 500, q represents 0 or from 1 to 1000, and r1 moieties each independently represent 1 or 2 or greater.

p, q, and r1 may each independently be an integer.

p+q+r1 can be made correspond to the number average molecular weight of the polyol compound (a1).

Note that —(CH$_2$CH$_2$—O)$_{r1}$—H in Formula (1) above corresponds to the case where a hydroxy group as the active hydrogen-containing group in the polyol compound (a1) is bonded to the ethylene oxide.

Additionally, (R—[—(ZO)$_p$—(AO)$_q$—]$_m$ that is a moiety other than —(CH$_2$CH$_2$—O)$_{r1}$—H in Formula (1) above corresponds to the linking group described above.

Active hydrogen-containing compound (R[—H]$_m$)

The active hydrogen-containing compound (R[—H]$_m$) in Formula (1) above is not particularly limited as long as the active hydrogen-containing compound is a compound having three active hydrogen (m=3). Examples of the active hydrogen-containing compound (R[—H]$_m$) include 1,1,1-trimethylolethane, 1,1,1-trimethylolpropane, glycerin; and polyether triol such as polyoxypropylene triol. The polyether triol is not particularly limited. Examples of the polyether triol include known polyether triol.

In a case where R[—H]$_m$ is, for example, 1,1,1-trimethylolethane, 1,1,1-trimethylolpropane, or glycerin, an example of a preferable aspect is one in which q in Formula (1) above is 1 or greater.

Z

Z represents an alkylene group having from 2 to 12 carbons, a cycloalkylene group, or combinations of these. The alkylene group may be of straight-chain or branched.

Examples of Z include an ethylene group, a propylene group, and a butylene group.

A

A represents an alkylene group having 3 carbons. Examples of the alkylene group having 3 carbons include a trimethylene group (straight-chain) and a propylene group (branched).

p p represents 0 or from 1 to 500. p is preferably 0.

q q represents 0 or from 1 to 1000. In a case where, for example, polyoxypropylene triol is used as the active hydrogen-containing compound (R[—H]$_m$) in the production of the polyol compound (a1), q may be 0.

r1 r1 represents 1 or 2 or more. r1 is preferably 2 or greater and can be 500 or less.

Number Average Molecular Weight

In an embodiment of the present invention, the number average molecular weight (Mn) of the polyol compound (a1) is greater than 1000 and 20000 or less.

From the perspective of more excellent effect according to an embodiment of the present invention, the Mn is preferably from 2000 to 15000, and more preferably from 5000 to 10000.

In an embodiment of the present invention, the number average molecular weight of the polyol compound (a1) can be calculated by Formula (Mn-1) below.

Number average molecular weight of polyol compound (a1)=(56100/OHV)×(Number of active hydrogen-containing groups per molecule of the polyol compound (a1)) (Mn-1)

In an embodiment of the present invention, the number of the active hydrogen-containing groups per molecule of the polyol compound (a1) is "3."

OHV

In Formula (Mn-1) above, OHV is a hydroxyl value (unit: mg KOH/g) of the polyol compound (a1). "OHV" is a value measured in accordance with JIS K1557-1:2007.

Number of active hydrogen-containing groups per molecule of polyol compound (a1)

"Number of active hydrogen-containing groups per molecule of polyol compound (a1)" is as described above.

Degree of Unsaturation

In an embodiment of the present invention, the degree of unsaturation of the polyol compound (a1) is 0.01 meq/g or less. The degree of unsaturation is in the predetermined range, and thus the composition according to an embodiment of the present invention provides excellent initial adhesiveness and excellent long-term adhesiveness.

From the perspective of more excellent effect according to an embodiment of the present invention, the degree of unsaturation is preferably from 0.001 to 0.008 meq/g.

The degree of unsaturation can be measured in accordance with the method specified in JIS K1557-3:2007.

Molecular Weight Distribution

In an embodiment of the present invention, the molecular weight distribution (Mw/Mn) of the polyol compound (a1) is 1.05 or less.

From the perspective of more excellent effect according to an embodiment of the present invention, the molecular weight distribution is preferably from 0.98 to 1.02.

The molecular weight distribution can be determined by a gel permeation chromatography (GPC) method calibrated with a polystyrene standard.

The molecular weight distribution (Mw/Mn) is preferably molecular weight distribution analyzed by measuring under conditions where four columns charged with a filler having a particle size of 3 μm and connected in series is used as a separation column, a resistance tube is connected to the reference side, and tetrahydrofuran is used as a developing solvent. The molecular weight distribution (Mw/Mn) is desirably molecular weight distribution (Mw/Mn) calculated by using a cubic approximation calibration curve using a polystyrene standard.

In an embodiment of the present invention, as for details of the measurement method of the molecular weight distribution, for example, JP 2017-206600 A ([0061] to [0075], [0197]) can be cited.

A method of producing the polyol compound (a1) is not particularly limited and, for example, the polyol compound (a1) can be produced by a known method of producing. An example of the method includes a method in which an alkylene oxide (for example, ethylene oxide) is subjected to ring-opening polymerization to have a predetermined molecular weight by using a base catalyst such as an imino group-containing phosphazenium salt catalyst, and, as required, a Lewis acid such as an aluminum compound as the active hydrogen-containing compound described above (R[—H]$_m$, m=3. For example, polyoxypropylene triol) serving as an initiator.

Examples of the imino group-containing phosphazenium salt catalyst include those described in JP 2011-132179 A.

Molar ratio of total amount of active hydrogen in compound (A) with respect to amount of isocyanate group In an embodiment of the present invention, a molar ratio of a total amount of active hydrogen in the compound (A) with respect to an amount of the isocyanate group in the urethane prepolymer is 0.2 or greater and less than 0.8.

The molar ratio is set to a predetermined range, and thus an embodiment of the present invention provides excellent initial adhesiveness, excellent long-term adhesiveness, and excellent adhesiveness after curing.

When the molar ratio is greater than 0.8, initial adhesiveness or long-term adhesiveness may be poor. Alternatively, adhesiveness after curing may be poor.

From the perspective of more excellent effect according to an embodiment of the present invention and excellent adhesiveness after curing, the molar ratio is preferably from 0.2 to 0.7, and more preferably from 0.3 to 0.6.

Polyol Compound (a2)

From the perspective of more excellent effect according to an embodiment of the present invention and excellent curability (for example, initial curability due to reaction with the urethane prepolymer in a case where heating is performed at from 40 to 80° C. for approximately from 5 to 60 minutes), the compound (A) preferably further includes a polyol compound (a2) having three or more active hydrogen-containing groups per molecule and having a number average molecular weight from 200 to 1000.

The polyol compound (a2) is a compound having a plurality of hydroxy groups.

Active hydrogen-containing group

The polyol compound (a2) may have hydroxy groups as the active hydrogen-containing groups.

The polyol compound (a2) can have three or more active hydrogen-containing groups (for example, hydroxy groups) per molecule. The number of the active hydrogen-containing groups (hydroxy groups) per molecule of the polyol compound (a2) is preferably 4 or more, and more preferably from 4 to 6, from the perspective of more excellent effect according to an embodiment of the present invention.

Terminal

From the perspective of more excellent effect according to an embodiment of the present invention (particularly, initial adhesiveness (specifically, for example, rapid curability at an initial period of adhesion)) and excellent curability (for example, initial curability due to reaction with the urethane prepolymer in a case where heating is performed at from 40 to 80° C. for approximately from 5 to 60 minutes), the polyol compound (a2) preferably has ethylene oxide at a terminal.

Note that "terminal" means a terminal with respect to all the polyol compound (a2).

The ethylene oxide can be represented by, for example, —(CH$_2$—CH$_2$—O)$_{r2}$—. The r2 moiety can be 1 or 2 or greater. An upper limit of the r2 moiety can be, for example, 250 or less.

An example of a preferable aspect is one in which the r2 moiety is 2 or greater. Note that, in the present specification, in a case where the r2 moiety is 2 or greater, the ethylene oxide may be referred to as "polyethylene oxide."

In a case where the polyol compound (a2) has a plurality of the ethylene oxides, the plurality of ethylene oxides may be identical or may differ.

Since the ethylene oxide is a divalent group, when the ethylene oxide is positioned at a terminal of the polyol compound (a2), another group can be bonded to an end portion of the ethylene oxide.

Examples of such another group include an active hydrogen-containing group (hydroxy group) in the polyol compound (a2).

In a case where the hydroxy group as the active hydrogen-containing group is bonded to an end portion of the ethylene oxide, an oxygen atom constituting the hydroxy group may constitute an oxygen atom at an end portion of the ethylene oxide.

Specifically, for example, the hydroxy group can be linked with the —(CH$_2$CH$_2$—O)$_{r2}$— moiety to form —(CH$_2$CH$_2$—O)$_{r2}$—H.

The polyol compound (a2) preferably has three or more, more preferably four or more, and even more preferably from four to six —(CH$_2$CH$_2$—O)$_{r2}$—H moieties per molecule from the perspective of more excellent effect according to an embodiment of the present invention.

The plurality of —(CH$_2$CH$_2$—O)$_{r2}$—H moieties may be identical or may differ.

Linking Group

In the polyol compound (a2), the ethylene oxide can be bonded to a linking group.

The linking group is not particularly limited as long as the linking group is a tri- or higher-valent group.

Examples of the linking group include polyether.

The polyether as the linking group can be the same as the polyether described in " . . . Polyether" above, for example.

Compound Represented by Formula (2)

Examples of the polyol compound (a2) include a compound represented by Formula (2) below.

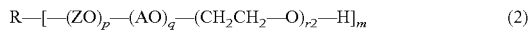  (2)

In Formula (2) above, R represents an m-valent group obtained by removing m active hydrogen from an active hydrogen-containing compound (R[—H]$_m$) used in the production of the compound represented by Formula (2).

m is 3 or greater.

Z represents an alkylene group having from 2 to 12 carbons, a cycloalkylene group, or combinations of these.

A represents an alkylene group having 3 carbons.

In a case where a plurality of the Z moieties or a plurality of the A moieties exist, the Z moieties may be identical or may differ, and the A moieties may be identical or may differ.

p represents 0 or from 1 to 250, q represents from 1 to 500, and r2 moieties each independently represent 1 or 2 or greater.

p, q, and r2 may each independently be an integer.

p+q+r2 can be made correspond to the number average molecular weight of the polyol compound (a2).

Note that —(CH$_2$CH$_2$—O)$_{r2}$—H in Formula (2) above corresponds to the case where a hydroxy group as the active hydrogen-containing group in the polyol compound (a1) is bonded to the ethylene oxide.

Additionally, (R—[—(ZO)$_p$—(AO)$_q$—]$_m$ that is a moiety other than —(CH$_2$CH$_2$—O)$_{r2}$—H in Formula (2) above corresponds to the linking group described above.

Active hydrogen-containing compound (R[—H]$_m$)

The active hydrogen-containing compound (R[—H]m) in Formula (2) above is not particularly limited as long as the active hydrogen-containing compound (R[—H]m) is a compound having m active hydrogen (m=3 or greater). Examples of the active hydrogen-containing compound (R[—H]m) include a trifunctional compound such as 1,1,1-trimethylolethane, 1,1,1-trimethylolpropane, and glycerin; and a tetra- or higher-functional compound such as pentaerythritol and dipentaerythritol.

Z

Z represents an alkylene group having from 2 to 12 carbons, a cycloalkylene group, or combinations of these. The alkylene group may be of straight-chain or branched.

Examples of Z include an ethylene group, a propylene group, and a butylene group.

A

A represents an alkylene group having 3 carbons. Examples of the alkylene group having 3 carbons include a trimethylene group and a propylene group.

p p represents 0 or from 1 to 250. p is preferably 0.

q q represents from 1 to 500.

r2 r2 represents 1 or 2 or greater. r2 is preferably 2 or greater and can be 250 or less.

Number average molecular weight

From the perspective of more excellent effect according to an embodiment of the present invention (especially, initial adhesiveness (specifically, for example, rapid curability at an initial period of adhesion)) and excellent curability (for example, initial curability due to reaction with the urethane prepolymer in a case where heating is performed at from 40 to 80° C. for approximately from 5 to 60 minutes), the number average molecular weight (Mn) of the polyol compound (a2) is preferably from 200 to 1000.

In an embodiment of the present invention, the number average molecular weight of the polyol compound (a2) can be calculated in the same manner as in the case of the polyol compound (a1).

A method of producing the polyol compound (a2) is not particularly limited. Examples of the method include a known method. A specific example of the method includes a method in which an alkylene oxide (for example, propylene oxide, ethylene oxide) is subjected to ring-opening polymerization by using a catalyst such as a potassium hydroxide or a double metal cyanide complex catalyst as the active hydrogen-containing compound described above (R[—H]$_m$, m=3 or greater) serving as an initiator.

Amount (H1) of active hydrogen in polyol compound (a1)

In a case where the compound (A) further includes the polyol compound (a2), from the perspective of more excellent effect according to an embodiment of the present invention and a very high level of balance between initial adhesiveness (specifically, for example, rapid curability immediately after adhesion) and long-term adhesiveness, an amount (H1) of the active hydrogen in the polyol compound (a1) is preferably from 20 to 80 mol %, and more preferably from 30 to 70 mol %, with respect to a total amount of the amount (H1) and an amount (H2) of the active hydrogen in the polyol compound (a2).

Amount (H2) of active hydrogen in polyol compound (a2)

In a case where the compound (A) further includes the polyol compound (a2), from the perspective of more excellent effect according to an embodiment of the present invention and a very high level of balance between initial adhesiveness (specifically, for example, rapid curability immediately after adhesion) and long-term adhesiveness, the amount (H2) of the active hydrogen in the polyol compound (a2) is preferably from 80 to 20 mol %, and more preferably from 70 to 30 mol %, with respect to the total amount of the amount (H1) and the amount (H2).

Other Optional Components

The composition according to an embodiment of the present invention can further contain, as required, various additives such as a filler (for example, carbon black and calcium carbonate), a curing catalyst, a plasticizer, an anti-aging agent, an antioxidant, a silane coupling agent, a pigment (dye), a thixotropic agent, a UV absorbers, a flame retardant, a surfactant (including a leveling agent), a dispersant, a dehydrating agent, an isocyanurate compound, an adhesion promoter such as a terpene resin, and an antistatic agent, in the range where the additives do not impair the object of the present invention.

Note that, for example, the filler may be subjected to surface treatment by at least one treatment agent selected from the group consisting of fatty acid, resin acid, a urethane compound, and fatty acid ester.

Additionally, whether the optional components are added to the main agent or the curing agent can be selected appropriately.

Additionally, the content of optional components described below indicates a total amount of all the optional components that can be in the composition according to an embodiment of the present invention. The optional components may be added to the main agent or the curing agent by the content described above, or the optional components by the content described above may be divided and added separately to the main agent and the curing agent.

Carbon black

The composition according to an embodiment of the present invention preferably further contains carbon black.

The carbon black is not particularly limited. Examples of the carbon black include Super Abrasion Furnace (SAF), Intermediate Super Abrasion Furnace (ISAF), High Abrasion Furnace (HAF), Fast Extruding Furnace (FEF), General Purpose Furnace (GPF), Semi-Reinforcing Furnace (SRF), Fine Thermal (FT), and Medium Thermal (MT).

Specifically, SEAST 9 (available from Tokai Carbon Co., Ltd.) as the SAF, Showa Black N 220 (available from Showa Cabot K.K.) as the ISAF, SEAST 3 (available from Tokai Carbon Co., Ltd.) and Niteron #200 (available from NSCC Carbon Co., Ltd.) as the HAF, and HTC #100 (available from Chubu Carbon K.K.) as the FEF are exemplified. Additionally, Asahi #55 (available from Asahi Carbon Co., Ltd.) and SEAST 5 (available from Tokai Carbon Co., Ltd.) as the GPF, Asahi #50 (available from Asahi Carbon Co., Ltd.) and Mitsubishi #5 (available from Mitsubishi Chemical Corporation) as the SRF, Asahi Thermal (available from Asahi Carbon Co., Ltd.) and HTC #20 (available from Chubu Carbon K.K.) as the FT, Asahi #15 (available from Asahi Carbon Co., Ltd.) as the MT, and the like are exemplified.

The content of the carbon black is preferably from 30 to 70 parts by mass, and more preferably from 40 to 60 parts by mass, with respect to 100 parts by mass of the urethane prepolymer.

Calcium carbonate

The composition according to an embodiment of the present invention preferably further contains calcium carbonate.

The calcium carbonate is not particularly limited. Examples of the calcium carbonate include heavy calcium carbonate, precipitated calcium carbonate (light calcium carbonate), and colloidal calcium carbonate.

The content of the calcium carbonate is preferably from 20 to 150 parts by mass, more preferably from 20 to 120 parts by mass, and even more preferably from 30 to 70 parts by mass, with respect to 100 parts by mass of the urethane prepolymer.

Examples of a filler other than carbon black and calcium carbonate include an organic or inorganic filler of any form. Specific examples of the filler include silica such as fumed silica, calcined silica, precipitated silica, pulverized silica, and molten silica; diatomaceous earth; iron oxide, zinc oxide, titanium oxide, barium oxide, magnesium oxide; magnesium carbonate, zinc carbonate; pyrophyllite clay, kaolin clay, calcined clay; and fatty acid-treated products, resin acid-treated products, urethane compound-treated products, and fatty acid ester-treated products of these.

Curing catalyst

The curing catalyst is not particularly limited, and specific examples of the curing catalyst include carboxylic acids such as 2-ethylhexanoic acid and oleic acid; phosphoric acids such as polyphosphoric acid, ethyl acid phosphate, and butyl acid phosphate; a bismuth catalyst such as bismuth octylate; a tin catalyst such as dibutyltin dilaurate and dioctyltin dilaurate; and a tertiary amine catalyst such as 1,4-diazabicyclo[2.2.2]octane, 2,4,6-tris(dimethylaminomethyl)phenol (for example, DMP-30), and a compound including a dimorpholinodiethyl ether structure.

From the perspective of more excellent predetermined adhesiveness, the curing catalyst preferably includes a dimorpholinodiethyl ether structure.

The dimorpholinodiethyl ether structure is a structure including dimorpholinodiethyl ether as a basic backbone.

In the dimorpholinodiethyl ether structure, a hydrogen atom in a morpholine ring may be substituted with a substituent. The substituent is not particularly limited. Examples of the substituent include an alkyl group. Examples of the alkyl group include a methyl group and an ethyl group.

Examples of the amine catalyst including the dimorpholinodiethyl ether structure include a compound represented by Formula (9) below.

[Chemical Formula 2]

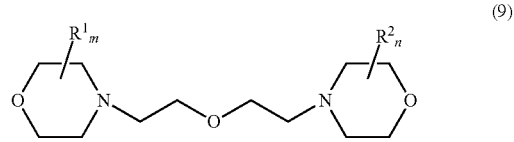

(9)

In Formula (9) above, $R^1$ and $R^2$ are each independently an alkyl group, and m and n are each independently 0, 1, or 2.

Specific examples of the amine catalyst including the dimorpholinodiethyl ether structure include dimorpholinodiethyl ether (DMDEE), di(methylmorpholino)diethyl ether, and di(dimethylmorpholino)diethyl ether.

The curing catalyst can be used alone or in combination of two or more types thereof.

The content of the curing catalyst is preferably from 0.05 to 2.0 parts by mass, more preferably from 0.1 to 0.5 parts by mass, and even more preferably from 0.15 to 0.45 parts by mass, with respect to 100 parts by mass of the urethane prepolymer.

In an embodiment of the present invention, since the compound (A) includes the polyol compound (a1), even when the content of the curing catalyst is set to less content than a known content, rapid adhesion is exhibited at an initial stage, and excellent initial adhesiveness is provided in applying the composition according to an embodiment of the present invention to a base material.

Plasticizer

Specific examples of the plasticizer include diisononyl phthalate (DINP); dioctyl adipate, isodecyl succinate; diethylene glycol dibenzoate, pentaerythritol ester; butyl oleate, methyl acetyl ricinoleate; tricresyl phosphate, trioctyl phosphate; propylene glycol adipate polyester, and butylene glycol adipate polyester. One type of these may be used alone, or two or more types of these may be used in combination.

The content of the plasticizer is preferably from 1 to 50 parts by mass, and more preferably from 5 to 40 parts by mass, with respect to 100 parts by mass of the urethane prepolymer.

Method of Producing

The method of producing the composition according to an embodiment of the present invention is not particularly limited. For example, production can be performed by a method in which the components in the main agent and the components in the curing agent are charged in separate containers, and are mixed in a nitrogen gas atmosphere in the respective container interiors.

Method of Use

As a method of use of the composition according to an embodiment of the present invention, the main agent and the curing agent may be used by mixing them.

The composition according to an embodiment of the present invention can be used for, for example, adhering of a base material.

Base Material

Examples of the base material to which the composition according to an embodiment of the present invention can be applied include plastic, glass, rubber, and metal. Suitable examples of the base material include a base material including plastic. The plastic may be, for example, a homopolymer, a copolymer, or a hydrogenated product. The same applies to rubber.

Examples of the plastic include polyolefin such as polypropylene, polyethylene, an ethylene propylene copolymer, a cycloolefin polymer (COP), and a cycloolefin copolymer (COC);

a polyester resin such as polyethylene terephthalate (PET) and polybutylene terephthalate (PBT);

a polymethyl methacrylate resin (PMMA resin); a polycarbonate resin; a polystyrene resin; an acrylonitrilestyrene copolymer resin; a polyvinyl chloride resin; an acetate resin; an acrylonitrile butadiene styrene resin (ABS resin); and a polyamide resin.

"COC" means a cycloolefin copolymer such as a copolymer of tetracyclododecene and olefin such as ethylene.

Additionally, "COP" means a cycloolefin polymer such as a polymer obtained by, for example, subjecting norbornenes to ring-opening polymerization and hydrogenation.

The plastic may be a poorly adhesive resin.

The base material may be subjected to surface treatment. Examples of the surface treatment include flame treatment, corona treatment, and ITRO treatment. A method of the surface treatment is not particularly limited. Examples of the method include a known method.

Suitable examples of the base material include a base material including polyolefin.

The base material can further include, for example, a filler in addition to the plastic (for example, polyolefin) or rubber.

Examples of the filler include carbon fiber;

glass such as glass filler;

talc, calcium carbonate, and alumina.

A method of applying the composition according to an embodiment of the present invention to the base material is not particularly limited. Examples of the method include a known method.

Curing

For example, the composition according to an embodiment of the present invention can be cured at from 5 to 90° C. and relative humidity of from 5 to 95%.

Curing mechanism

The present inventors presume a mechanism of curing of the composition according to an embodiment of the present invention as follows.

Since the curing agent in the composition according to an embodiment of the present invention contains the polyol compound (a1), when the main agent and the curing agent are mixed and applied to a base material, in an initial stage, the urethane prepolymer and the polyol compound (a1) rapidly react (to form a urethane bond) and the composition according to an embodiment of the present invention can be semi-cured.

In this way, when the composition according to an embodiment of the present invention is rapidly semi-cured, the base material can be fixed to a certain degree (temporary fixing), and thus excellent workability is provided.

Additionally, in the composition according to an embodiment of the present invention, the molar ratio of the total amount of the active hydrogen in the compound (A) with respect to the amount of the isocyanate group in the urethane prepolymer is less than 0.8, and thus, the isocyanate group in the urethane prepolymer may remain unreacted in the composition according to an embodiment of the present invention after the reaction with the compound (A). In a case where the isocyanate groups in the urethane prepolymer react with each other by water such as moisture, the reaction rate is typically low.

Thus, while the isocyanate groups in the urethane prepolymer slowly react with each other by water such as moisture (to form a urea bond) and cure to form an adhesive layer, the isocyanate group of the urethane prepolymer can be bonded or interact with the base material immediately after application to the base material, and thus the adhesive layer can be bonded to the base material.

In this way, the composition according to an embodiment of the present invention can be semi-cured at an initial stage, and then can be bonded sufficiently to the base material while gradually curing. Thus, it is considered that the composition according to an embodiment of the present invention provides excellent initial adhesiveness (specifically, for example, excellent start of initial adhesion) and excellent long-term adhesiveness (long-term reliability of adhesiveness).

Application

Examples of application of the composition according to an embodiment of the present invention include a direct glazing adhesive, a sealant for an automobile, an adhesive agent for an automobile, and a sealant for a building component.

EXAMPLES

An embodiment of the present invention will be described below in detail by way of examples. However, an embodiment of the present invention is not limited to such examples.

Preparation of Polyol Compound (a1)

Dehydration and desolvation were sufficiently performed by using an imino group-containing phosphazenium salt (IPZ) catalyst and triisopropoxy aluminum together, and a trifunctional polyoxypropylene polyol having a molecular weight of 400 and sufficiently dehydrated ethylene oxide were added to these, and the ethylene oxide was added to the polyoxypropylene polyol, and thus polypropylene glycol having three hydroxy groups (as active hydrogen-containing groups) per molecule (trifunctional) and having ethylene oxide at a terminal was obtained. The polypropylene glycol is used as a polyol compound (a1-1).

The polyol compound (a1-1) can be represented by the formula below.

Formula: (residue of polyoxypropylene polyol having molecular weight of 400)-$[(CH_2-CH_2-O)_{r1}-H]_3$ (r1 moieties are each independently 1 or greater)

In the formula above, "(residue of polyoxypropylene polyol having molecular weight of 400)" corresponds to R in Formula (1) above, and p and q in Formula (1) above are 0.

The OHV, the number average molecular weight, the number of functional groups (number of active hydrogen-containing groups per molecule), the degree of unsaturation, the molecular weight distribution, and the like of the polyol compound (a1-1) are shown in Table 1. The same applies to a polyol compound (a2-1).

Production of Two-Part Urethane Adhesive Composition

Each main agent and each curing agent were produced by mixing components of Table 1 below according to composition (parts by mass) shown in the same table by using an agitator.

Next, 100 g of the main agent produced as described above and the curing agent produced as described above were mixed at a mass ratio shown in the column of "Main agent/curing agent" shown in Table 1, and a two-part urethane adhesive composition (adhesive composition) was obtained.

Note that, in Table 1, an amount of a urethane prepolymer 1 is a net amount of a urethane prepolymer in the urethane prepolymer 1. Additionally, a used amount of a plasticizer (DINP) in the urethane prepolymer 1 in Table 1 is included in a used amount of "Plasticizer 1" of the main agent of Table 1. The same applies to a urethane prepolymer 2.

Evaluation

Samples described below were manufactured by using the adhesive compositions produced as described above, and a tensile shearing test was performed by using each of the samples to evaluate initial adhesiveness (initial adhesiveness 1), adhesiveness after curing (initial adhesiveness 2), and long-term adhesiveness (long-term adhesiveness 1 and 2). The results are shown in Table 1.

Tensile Shearing Test

For each of the samples, a tensile shearing test (pulling speed of 50 mm/min at 20° C.) was performed in accordance with JIS K6850:1999 to measure shear strength (MPa), and a failure state of the sample after the tensile shearing test was visually observed.

Evaluation Reference for Failure State

The case where the failure state included only cohesive failure of the adhesive layer was indicated as "CF."

"AF" means that the adhesive layer peeled at an interface with an adherend (interfacial failure).

"AF/CF" means that the failure state included both CF and AF.

Preferably, the failure state is "CF."

Evaluation Reference

Evaluation of initial adhesiveness (initial adhesiveness 1)

In an embodiment of the present invention, initial adhesiveness was evaluated as initial adhesiveness 1.

In an embodiment of the present invention, the case where the failure state of the initial adhesiveness 1 is "CF" is evaluated as excellent initial adhesiveness. The case where the failure state is "CF" and shear strength is 1.8 MPa or more is evaluated as more excellent initial adhesiveness.

Note that, in a case where the evaluation result of the failure state is equivalent for initial adhesiveness, as shear strength is higher, initial adhesiveness is more excellent.

Evaluation of adhesiveness of cured sample (initial adhesiveness 2)

Preferably, the failure state of the initial adhesiveness 2 is "CF" from the perspective of excellent adhesiveness of a cured sample described below.

Additionally, preferably, the shear strength of the initial adhesiveness 2 is 2.5 MPa or greater from the perspective of excellent adhesiveness of the cured sample.

Note that, in a case where the evaluation result of the failure state is equivalent for the adhesiveness of the cured samples, as shear strength is higher, adhesiveness of the cured sample is more excellent.

Long-term adhesiveness

In an embodiment of the present invention, the case where the failure states of the long-term adhesiveness 1 and 2 are "CF" is evaluated as excellent long-term adhesiveness.

Preferably, the shear strength of the long-term adhesiveness 1 is 2.5 MPa or greater.

Preferably, the shear strength of the long-term adhesiveness 2 is 2.5 MPa or greater.

Note that, in a case where the evaluation result of the failure state is equivalent for the long-term adhesiveness 1, as shear strength is higher, the long-term adhesiveness 1 is more excellent. The same applies to the long-term adhesiveness 2.

Manufacture of Sample

Two adherends each formed by subjecting one surface of a substrate (width: 25 mm, length: 120 mm, thickness: 3 mm) formed from a polypropylene resin (trade name: Nobrene, available from Sumitomo Chemical Co., Ltd.) to flame treatment were prepared.

After each of the adherends was subjected to the flame treatment, it was confirmed by using the Wetting Tension Test Mixture (available from Wako Pure Chemical Industries, Ltd.) that the wettability of a surface of the resin was 45.0 mN/m or greater.

Then, each of the adhesive compositions produced as described above was applied to a surface (surface subjected to the flame treatment) of one of the adherends to have a width of 25 mm, a length of 10 mm, and a thickness of 5 mm. Subsequently, the surface of the one of the adherends was made adhere to a surface (surface subjected to the flame treatment) of the other adherend, and thus a sample was obtained.

Adhesiveness

Initial adhesiveness 1 (after 1 hour)

The sample obtained as described above was left to stand at 25° C. and relative humidity of 50% RH for 1 hour.

After 1 hour, the sample was subjected to the tensile shearing test.

Initial adhesiveness 2 (after 3 days)

The sample obtained as described above was left to stand at 25° C. and relative humidity of 50% RH for 3 days, and thus a cured sample was obtained.

The cured sample was subjected to the tensile shearing test.

Long-term adhesiveness 1 (after water immersion and aging)

The cured sample obtained as described above was left in water at 50° C. for 14 days, and after 14 days, the cured sample was taken out from the water, and thus a sample after water immersion and aging was obtained.

The sample after water immersion and aging was subjected to the tensile shearing test.

Long-term adhesiveness 2 (after heat aging)

The cured sample obtained as described above was left to stand at 90° C. for 14 days, and thus a sample after heat aging was obtained.

The sample after heat aging was subjected to the tensile shearing test.

TABLE 1-1

| | Table 1 | Information relating to polyol compound | | | | | Comparative Example 1 | Example 1 |
|---|---|---|---|---|---|---|---|---|
| | | OHV (mg KOH/g) | Number average molecular weight (Mn) | Number of functional groups | Degree of unsaturation (meq/g) | Molecular weight distribution (Mw/Mn) | Presence of EO terminal | | |
| Main agent | Urethane prepolymer 1 | | | | | | | 42.45 | 42.45 |
| | Urethane prepolymer 2 | | | | | | | | |
| | Compound 1 | | | | | | | 1.7 | 1.7 |
| | Compound 2 | | | | | | | 0.3 | 0.3 |
| | Carbon black | | | | | | | 20.6 | 20.6 |
| | Calcium carbonate 1 | | | | | | | 19.3 | 19.3 |
| | Plasticizer 1 | | | | | | | 15.5 | 15.5 |
| | Curing catalyst 1 | | | | | | | 0.15 | 0.15 |
| | Total | | | | | | | 100.00 | 100.00 |
| Curing agent | Comparative polyol compound | 28.8 | 6000 | 3 | 0.023 | 1.110 | EO terminal is present | 58.0 | |
| | Polyol compound (a1-1) | 21.4 | 7864 | 3 | 0.006 | 1.011 | EO terminal is present | | 58.0 |
| | Polyol compound (a2-1) | 450.0 | 500 | 4 | — | — | EO terminal is present | 5.0 | 5.0 |
| | Calcium carbonate 2 | | | | | | | 36.7 | 36.7 |
| | Curing catalyst 2 | | | | | | | 0.3 | 0.3 |
| | Total | | | | | | | 100.0 | 100.0 |
| Molar ratio of amount of active hydrogen in comparative polyol compound or amount (H1) of active hydrogen in polyol compound (a1-1) with respect to total amount of active hydrogen in polyol compound [*1] | | | | | | | | 0.4 | 0.4 |
| Molar ratio of amount (H2) of active hydrogen in polyol compound (a2-1) with respect to total amount of active hydrogen in polyol compound [*2] | | | | | | | | 0.6 | 0.6 |
| Main agent/curing agent (mass ratio) | | | | | | | | 10/1 | 10/1 |
| Molar ratio of total amount of active hydrogen in compound (A) with respect to amount of isocyanate group in urethane prepolymer: OH/NCO (molar ratio) | | | | | | | | 0.4672 | 0.4160 |
| Adhesiveness (Tensile shearing test result) | Evaluation of initial adhesiveness: | | | | | Failure state | | AF/CF | CF |
| | Initial adhesiveness 1 (after 1 hour) | | | | | Strength [MPa] | | 1.5 | 2.1 |
| | Evaluation of adhesiveness of cured sample: | | | | | Failure state | | CF | CF |
| | Initial adhesiveness 2 (after 3 days) | | | | | Strength [MPa] | | 3.2 | 3.5 |
| | Long-term adhesiveness 1 (after water immersion and aging) (50° C. water, 14 days) | | | | | Failure state | | CF | CF |
| | | | | | | Strength [MPa] | | 2.9 | 3.4 |
| | Long-term adhesiveness 2 (after heat aging) (90° C., 14 days) | | | | | Failure state | | AF/CF | CF |
| | | | | | | Strength [MPa] | | 2.9 | 3.8 |

TABLE 1-2

| Table 1 | | OHV (mg KOH/g) | Number average molecular weight (Mn) | Number of functional groups | Degree of unsaturation (meq/g) | Molecular weight distribution (Mw/Mn) | Presence of EO terminal | Comparative Example 2 | Comparative Example 3 |
|---|---|---|---|---|---|---|---|---|---|
| | | | | Information relating to polyol compound | | | | | |
| Main agent | Urethane prepolymer 1 | | | | | | | 42.45 | |
| | Urethane prepolymer 2 | | | | | | | | 42.45 |
| | Compound 1 | | | | | | | 1.7 | 1.7 |
| | Compound 2 | | | | | | | 0.3 | 0.3 |
| | Carbon black | | | | | | | 20.6 | 20.6 |
| | Calcium carbonate 1 | | | | | | | 19.3 | 19.3 |
| | Plasticizer 1 | | | | | | | 15.5 | 15.5 |
| | Curing catalyst 1 | | | | | | | 0.15 | 0.15 |
| | Total | | | | | | | 100.00 | 100.00 |
| Curing agent | Comparative polyol compound | 28.8 | 6000 | 3 | 0.023 | 1.110 | EO terminal is present | | 58.0 |
| | Polyol compound (a1-1) | 21.4 | 7864 | 3 | 0.006 | 1.011 | EO terminal is present | 40.0 | |
| | Polyol compound (a2-1) | 450.0 | 500 | 4 | — | — | EO terminal is present | 23.0 | 5.0 |
| | Calcium carbonate 2 | | | | | | | 36.7 | 36.7 |
| | Curing catalyst 2 | | | | | | | 0.3 | 0.3 |
| | Total | | | | | | | 100.0 | 100.0 |
| Molar ratio of amount of active hydrogen in comparative polyol compound or amount (H1) of active hydrogen in polyol compound (a1-1) with respect to total amount of active hydrogen in polyol compound *1 | | | | | | | | 0.1 | 0.4 |
| Molar ratio of amount (H2) of active hydrogen in polyol compound (a2-1) with respect to total amount of active hydrogen in polyol compound *2 | | | | | | | | 0.9 | 0.6 |
| Main agent/curing agent (mass ratio) | | | | | | | | 10/1 | 10/1 |
| Molar ratio of total amount of active hydrogen in compound (A) with respect to amount of isocyanate group in urethane prepolymer: OH/NCO (molar ratio) | | | | | | | | 1.3350 | 0.4768 |
| Adhesiveness (Tensile shearing test result) | Evaluation of initial adhesiveness: | Failure state | | | | | | AF/CF | AF/CF |
| | Initial adhesiveness 1 (after 1 hour) | Strength [MPa] | | | | | | 1.9 | 2.0 |
| | Evaluation of adhesiveness of cured sample: | Failure state | | | | | | AF/CF | AF/CF |
| | Initial adhesiveness 2 (after 3 days) | Strength [MPa] | | | | | | 2.7 | 2.9 |
| | Long-term adhesiveness 1 (after water immersion and aging) (50° C. water, 14 days) | Failure state | | | | | | AF/CF | CF |
| | | Strength [MPa] | | | | | | 2.0 | 2.9 |
| | Long-term adhesiveness 2 (after heat aging) (90° C., 14 days) | Failure state | | | | | | AF/CF | AF/CF |
| | | Strength [MPa] | | | | | | 2.8 | 2.9 |

Note that the value in the column of the molar ratio *1 shown in Table 1 is a ratio and is not shown as a percentage. When the molar ratio *1 of Comparative Example 1 is shown as a percentage, it is 40 mol %. The same applies to the molar ratio *2 of Table 1.

Details of each component indicated in Table 1 are as follows.

Main Agent

Urethane prepolymer 1: Urethane prepolymer produced by using 25 parts by mass of polyoxypropylene diol (trade name: SANNIX PP2000, available from Sanyo Chemical Industries, Ltd.; number average molecular weight: 2000), 50 parts by mass of polyoxypropylene triol (trade name: EXCENOL 5030, available from Asahi Glass Co., Ltd.; number average molecular weight: 5000), and MDI (trade name: Sumidur 44S, available from Sumika Covestro Urethane Co., Ltd., the same applies hereinafter) to obtain NCO/OH (molar ratio) of 1.6, and further mixing 20 parts by mass of a plasticizer (DINP) to these, and allowing an obtained mixture to react at 80° C. for 5 hours. The obtained urethane prepolymer is used as the urethane prepolymer 1. NCO content of urethane prepolymer 1: 1.48 mass %

Urethane prepolymer 2

Urethane prepolymer produced by using the polyol compound (a1-1) prepared as described above and MDI to obtain NCO/OH (molar ratio) of 2.2, and further mixing 20 parts by mass of a plasticizer (DINP) to these, and allowing an obtained mixture to react at 80° C. for 5 hours. The obtained urethane prepolymer is used as the urethane prepolymer 2. NCO content of urethane prepolymer 2: 1.45 mass %

Compound 1: Isocyanurate of pentamethylene diisocyanate represented by Formula (C1-2) below (available from Mitsui Chemicals, Inc.). NCO content: 23.6 mass %

[Chemical Formula 3]

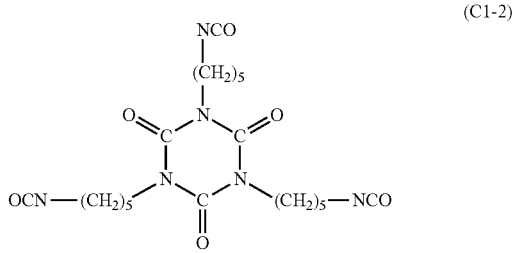

(C1-2)

Compound 2: Terpene resin represented by Formula (8) below. YS RESIN CP (available from Yasuhara Chemical Co., Ltd.)

[Chemical Formula 4]

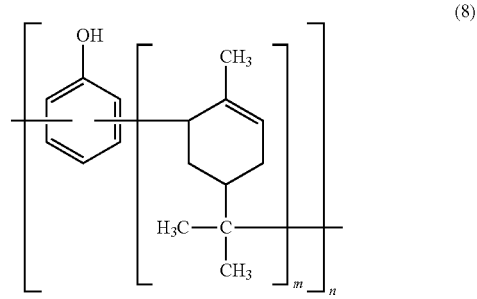

(8)

In Formula (8) above, m represents from 2 to 3, and n represents from 1 to 2.

Carbon black: Trade name: #200 MP, available from NSCC Carbon Co., Ltd.

Calcium carbonate 1: Heavy calcium carbonate, trade name: Super S, available from Maruo Calcium Co., Ltd.

Plasticizer 1: Diisononyl phthalate (DINP), available from J-Plus Co., Ltd.

Curing catalyst 1: Dimorpholinodiethyl ether (DMDEE), trade name: UCAT-660M, available from San-Apro Ltd.

Curing Agent

Comparative polyol compound: Oxypolyoxypropylene triol having polyethylene oxide at a terminal. Trade name: PREMINOL 7001K, available from Asahi Glass Co., Ltd. A catalyst used in the production of the comparative polyol compound is a double metal cyanide complex (DMC catalyst). The degree of unsaturation and the molecular weight distribution of the comparative polyol compound are not within the predetermined range.

Polyol compound (a1-1): Polyol compound (a1-1) prepared as described above. The polyol compound (a1-1) corresponds to the polyol compound (a1) described above.

Polyol compound (a2-1): EXCENOL 450ED, available from Asahi Glass Co., Ltd. Polyoxypropylene tetraol that is tetrafunctional and that has ethylene oxide at a terminal. The polyol compound (a2-1) can be represented by Formula: polyoxypropylene-$[(CH_2-CH_2-O)_{r2}-H]_4$ (r2 moieties are each independently 1 or greater). Note that, in the formula above, "R" in Formula (2) above is omitted. In the formula above, "polyoxypropylene-" corresponds to a linking group.

The polyol compound (a2-1) corresponds to the polyol compound (a2) described above.

Calcium carbonate 2: Calcium carbonate subjected to surface treatment with fatty acid, KALFAIN 200, available from Maruo Calcium Co., Ltd.

Curing catalyst 2: Dimorpholinodiethyl ether (DMDEE), trade name: UCAT-660M, available from San-Apro Ltd.

As can be seen from the results shown in Table 1, Comparative Examples 1 and 3 in which the curing agent included no predetermined polyol compound (a1) and, instead, included the comparative polyol compound having a different degree of unsaturation and different molecular weight distribution provided low initial adhesiveness and long-term adhesiveness.

Comparative Example 2 in which the molar ratio of the total amount of the active hydrogen in the compound (A) with respect to the amount of the isocyanate group in the urethane prepolymer was 0.8 or greater provided low initial adhesiveness and long-term adhesiveness.

On the other hand, the composition according to an embodiment of the present invention provided excellent initial adhesiveness and excellent long-term adhesiveness.

The invention claimed is:

1. A two-part urethane adhesive composition comprising:
a main agent containing a urethane prepolymer having an isocyanate group; and
a curing agent containing a compound (A) having two or more active hydrogen-containing groups per molecule;
the compound (A) comprising a polyol compound (a1) and a polyol compound (a2), the polyol compound (a1) having three active hydrogen-containing groups per molecule, having ethylene oxide at a terminal, having a number average molecular weight of greater than 1000 and 20000 or less, having a degree of unsaturation of 0.01 meq/g or less, and having molecular weight distribution (Mw/Mn) of 1.05 or less, and
the polyol compound (a2), having three or more active hydrogen-containing groups per molecule and having a number average molecular weight of from 200 to 1000, and
a molar ratio of a total amount of active hydrogen in the compound (A) with respect to an amount of the isocyanate group being 0.2 or greater and less than 0.8,
wherein an amount (H1) of active hydrogen in the polyol compound (a1) is from 20 to 80 mol % with respect to a total of the amount (H1) and an amount (H2) of active hydrogen in the polyol compound (a2), and
the amount (H2) is from 80 to 20 mol % with respect to the total of the amount (H1) and the amount (H2).

2. The two-part urethane adhesive composition according to claim 1, wherein each of the active hydrogen-containing groups in the polyol compound (a1) is a hydroxyl group, the ethylene oxide in the polyol compound (a1) is represented by $-(CH_2CH_2-O)_{r1}-$, where the r1 moiety is 1 or 2 or greater, and the hydroxy group and the $-(CH_2CH_2-O)_{r1}-$ moiety are linked to form $-(CH_2CH_2-O)_{r1}-H$.

3. The two-part urethane adhesive composition according to claim 2, wherein the polyol compound (a1) has three $-(CH_2CH_2-O)_{r1}-H$ moieties per molecule.

4. The two-part urethane adhesive composition according to claim 1, wherein, in the polyol compound (a1), each of the active hydrogen-containing groups is bonded to a linking group via the ethylene oxide.

5. The two-part urethane adhesive composition according to claim 1, wherein the polyol compound (a2) has ethylene oxide at a terminal.

6. The two-part urethane adhesive composition according to claim 1, wherein each of the active hydrogen-containing groups in the polyol compound (a2) is a hydroxyl group, the polyol compound (a2) has ethylene oxide at a terminal, the ethylene oxide in the polyol compound (a2) is represented by $-(CH_2CH_2-O)_{r2}-$, where the r2 moiety is 1 or more, and the hydroxy group and the $-(CH_2CH_2-O)_{r2}-$ moiety are linked to form $-(CH_2CH_2-O)_{r2}-H$.

7. The two-part urethane adhesive composition according to claim 6, wherein the polyol compound (a2) has four or more $-(CH_2CH_2-O)_{r2}-H$ moieties per molecule.

8. The two-part urethane adhesive composition according to claim 1, wherein the polyol compound (a2) has ethylene oxide at a terminal and, in the polyol compound (a2), each of the active hydrogen-containing groups is bonded to a linking group via the ethylene oxide.

9. The two-part urethane adhesive composition according to claim 1, used for adhering of a base material.

10. The two-part urethane adhesive composition according to claim 9, wherein the base material comprises a polyolefin.

11. The two-part urethane adhesive composition according to claim 1, wherein the composition further comprises an amine-based curing catalyst, and the amine-based curing catalyst is contained at an amount of 0.05 to 0.5 parts by mass with respect to 100 parts by mass of the urethane prepolymer.

12. The two-part urethane adhesive composition according to claim 1, wherein the compound A consists of the polyol compound (a1) and the polyol compound (a2).

13. The two-part urethane adhesive composition according to claim 1, wherein the polyol compound (a2) has a number average molecular weight of from 200 to 500.

* * * * *